(12) United States Patent
Akamatsu

(10) Patent No.: US 7,877,215 B2
(45) Date of Patent: Jan. 25, 2011

(54) EVALUATION METHOD FOR ROLLING BEARING PART

(75) Inventor: Yoshinobu Akamatsu, Iwata (JP)

(73) Assignee: NTN Corporation, Osaka (JP)

( * ) Notice: Subject to any disclaimer, the term of this patent is extended or adjusted under 35 U.S.C. 154(b) by 442 days.

(21) Appl. No.: 11/989,755

(22) PCT Filed: Jul. 14, 2006

(86) PCT No.: PCT/JP2006/314041

§ 371 (c)(1),
(2), (4) Date: Jan. 31, 2008

(87) PCT Pub. No.: WO2007/015360

PCT Pub. Date: Feb. 8, 2007

(65) Prior Publication Data

US 2010/0089162 A1    Apr. 15, 2010

(51) Int. Cl.
*G01M 13/04* (2006.01)
(52) U.S. Cl. .......................... 702/34; 73/593
(58) Field of Classification Search ............ 702/33–36; 700/175, 176; 73/593, 114.81, 660
See application file for complete search history.

(56) References Cited

U.S. PATENT DOCUMENTS 7,421,349 B1 * 9/2008 Stack ..................... 702/35

FOREIGN PATENT DOCUMENTS

| JP | 6-58849 | 3/1994 |
| JP | 2000-74048 | 3/2000 |

OTHER PUBLICATIONS

Yoshinobu Akamatsu, "Effects of Rolling Element Material on Vibration of Bearing", Proceeding of Conference on Tribology by Tribology Society, Nov. 2001, pp. 291-292.
Tomoya Sakaguchi et al., "Simulation for Ball Bearing Vibration", NTN Technical Revue, vol. 69, 2001, pp. 69-75.
International Search Report (PCT/ISA/210) mailed Oct. 17, 2006 in connection with the PCT application PCT/JP2006/314041.
International Preliminary Report on Patentability, mailed Feb. 14, 2008 and issued in corresponding International Patent Application No. PCT/JP2006/314041.

\* cited by examiner

*Primary Examiner*—Manuel L Barbee

(57) ABSTRACT

An evaluation method for a rolling bearing part capable of easily and properly detecting deformation of the rolling contact surface of the rolling bearing part formed of raceway rings or rolling element of a rolling bearing. First, the order and amplitude of waviness on the rolling contact surface of the rolling bearing part are obtained by harmonic analysis for the circularity of the rolling contact surface. The order and amplitude of waviness so obtained are logarithmically converted, and the regression line showing a relation between the logarithmically converted order of waviness and the amplitude of waviness is obtained. Based on the deviation from the regression line, the deformation of the rolling contact surface is evaluated.

6 Claims, 3 Drawing Sheets

US 7,877,215 B2

EVALUATION METHOD FOR ROLLING BEARING PART

CROSS REFERENCE TO RELATED APPLICATIONS

This application claims the benefit under 35 U.S.C. Section 371, of PCT International Application Number PCT/JP2006/314041, filed Jul. 14, 2006 and Japanese Application No. 2005-224911 filed Aug. 3, 2005 in Japan, the contents of which are incorporated herein by reference.

BACKGROUND OF THE INVENTION

1. Field of the Invention

The present invention relates to an evaluation method for forms of rolling bearing parts, such as, inner rings, outer rings or rolling elements.

2. Description of the Prior Art

Form errors or geometric imperfections in a rolling bearing part cause vibration in mechanical apparatus inside which the rolling bearing is incorporated. As a method for managing and controlling the rolling contact surface, which is the raceway surface for the inner ring and the outer ring of the rolling bearing, as well as the rolling contact surface of the rolling elements, which cause vibration, scratches are detected by attendant worker's eye, the surface roughness is measured using a roughness gauge, or the circularity is measured using a circularity measuring gauge. The detected or measured results are compared with associated standard values.

In addition, the order of waviness which causes vibration is determined for the bearing with preload from the geometric relationship (Non-Patent Documents 1 and 2), and therefore, the value of the order of waviness is controlled independently. In this case, the amplitude of the order of waviness can be quantified through harmonic analysis, using a circularity measuring gauge.

Non-Patent Document 1: Tomoya Sakaguchi and Yoshinobu Akamatsu, "Simulation for Ball Bearing Vibration," NTN Technical Revue, Vol. 69, 2001, pp. 69-75

Non-Patent Document 2: Yoshinobu Akamatsu, "Effects of Rolling Element Material on Vibration of Bearing," Proceedings of Conference on Tribology by Tribology Society, November 2001, pp. 291 and 292.

In bearings used in a gap state, that is, bearings used under such conditions that a load range and a load-free range exist in the bearings, however, rolling components (rolling elements and raceway rings) which pass through the load range generate vibration in the stationary ring, and therefore, vibration is not caused by waviness of any particular order of waviness, but vibration is caused in the bearing by every order of waviness. Accordingly, in the case where vibration is controlled on the basis of the order of waviness, it is required to devise a technique capable to easily detect whether the waviness of any specific order of waviness has a relatively great amplitude or not.

In this respect, when the relationship between the order of waviness and the amplitude of the above described waviness is expressed on scales with logarithm axes, it becomes linear in a normal work process (Cited Document 2). This is because vibration in the processing machine for the bearing part causes a form error of the bearing, and in general, the higher the degree of vibration is, the smaller the amplitude is. Accordingly, the amplitude or amount of the error of the processed surface in the bearing part decreases in accordance with advance of the order of waviness. However, when the processed surface exhibits abnormal waviness, the amplitude of the order of waviness deviates from the linear relationship.

SUMMARY OF THE INVENTION

An object of the present invention is to provide an evaluation method for a rolling bearing part according to which deformation on the rolling contact surface of a rolling bearing part can be easily and appropriately detected.

The evaluation method for a rolling bearing part according to the present invention is a method for evaluating the rolling bearing part made of a raceway ring or a rolling element in a rolling bearing, and including the steps of: measuring the deviation at plural points on a rolling contact surface in the rolling bearing part from the circularity to obtain the relationship between the order of waviness and the amplitude of waviness on the rolling contact surface through harmonic analysis of the measured values at respective points; logarithmically converting so obtained relationship between the order and the amplitude of waviness; defining a regression line showing the relationship between the order of waviness and the amplitude of waviness at the coordinates that have been logarithmically converted; and evaluating deformation on the rolling contact surface based on the deviation at each point from the above described regression line showing the relationship between the order and the amplitude of waviness at the above described coordinates that have been logarithmically converted.

Here, the rolling contact surface of the raceway ring represents a raceway surface. It is not necessary to calculate the deviation itself during the process for evaluating the deformation on the above described rolling contact surface using the above described deviation, and the deformation may be evaluated by, for example, comparing a reference value gained by adding a predetermined value to the value that has linearly regressed and the measured value, which is a value including the deviation.

According to this evaluation method, after the harmonic analysis on the circularity of the rolling surface, the relationship between the order of waviness and the amplitude are logarithmically converted in order to evaluate the deformation using the deviation from the regression line as a reference, and therefore, abnormal points can be detected on the basis of the degree of deviation, from the relationship between the order of waviness and the amplitude, which are in a linear relationship. Therefore, the deformation on the rolling contact surface in the rolling bearing part can be easily and appropriately detected, so that countermeasures can be taken against such deformation, and thus, the vibration of the rolling bearing can be reduced.

In this case, the deviation from the linear relationship can be supervised using the ratio between the deviation from the regression line at the coordinates that have been logarithmically converted and the standard deviation.

The evaluation method may introduce an appropriate reference value based on the standard deviation of the relationship between the order of waviness and the amplitude at the above described coordinates that have been logarithmically converted, and the deformation may be determined to be abnormal when the deviation is equal to or greater than such reference value.

More specifically, during the process of logarithmic conversion, the order of waviness n (n is a natural number) is converted to $X=\text{Log}(n)$, and the amplitude rn of the order of waviness n is converted to $Y=\text{Log}(rn)$, so that $Y=aX+b$ (a and b are constants) is defined as the regression line in the process for defining the regression line. Where the measured and converted value Yn of the waviness of order n is equal to or greater than a value obtained by adding the value $m\sigma$ (m is an arbitrarily set constant) with the standard deviation $\sigma$ of the measured values to the value $aX+b$ which has been linearly regressed, it may be determined to be abnormal.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DESCRIPTION OF THE PREFERRED EMBODIMENT

Figure 1:
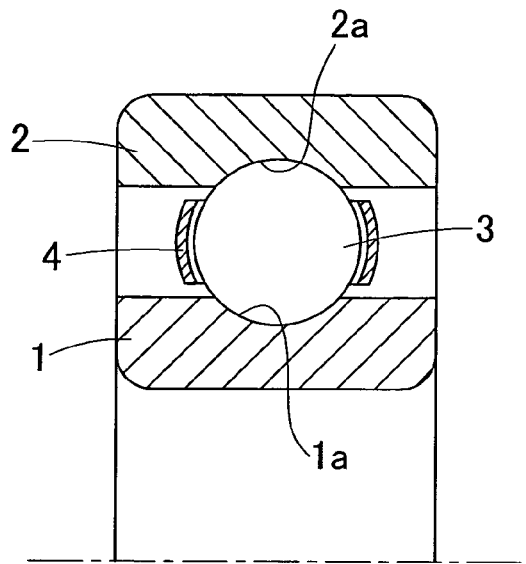
FIG. 1 is a longitudinal sectional view showing a rolling bearing to which the evaluation method for a rolling bearing part according to one embodiment of the present invention is applied.

One embodiment of the present invention is described in reference to the drawings. This evaluation method for a rolling bearing part is a method for evaluating a rolling bearing part which is a raceway ring or a rolling element in a rolling bearing. As shown in FIG. 1, the rolling bearing is, for example, a deep groove ball bearing having an inner ring 1 and an outer ring 2, which are raceway rings, and a plurality of rolling elements 3 made of steel balls interposed between raceway surfaces or rolling contact surfaces 1a and 2a of the inner ring 1 and the outer ring 2. The rolling elements 3 are held by a cage 4. Here, the rolling elements 3 are assumed to be the rolling bearing part which is the object of evaluation.

Figure 2:
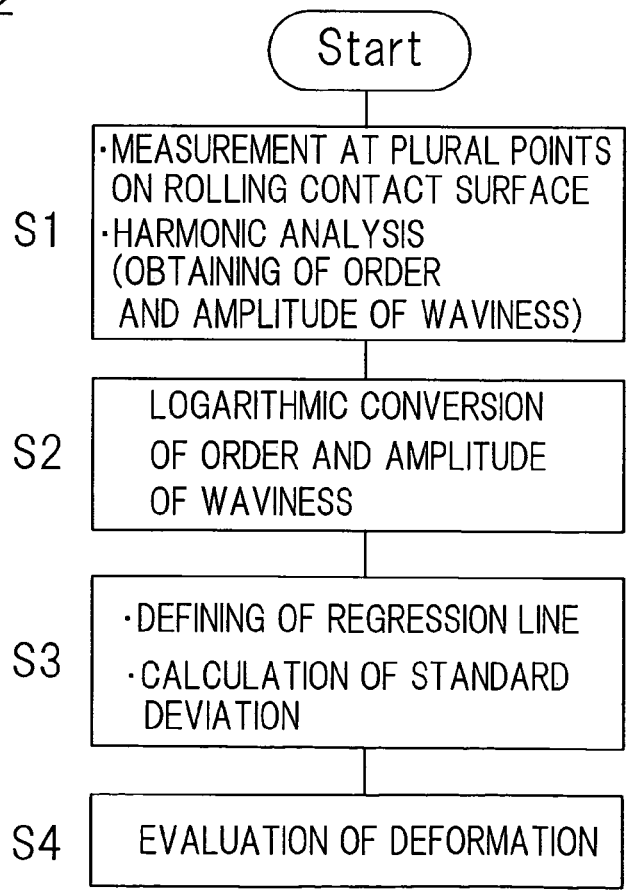
FIG. 2 is a flow chart of the evaluation method.

As shown in FIG. 2, this evaluation method for a rolling bearing part includes: the step (S1) of measuring the deviation at each point on a rolling contact surface or a spherical surface of the rolling element 3 from the circularity, and thus obtaining the relationship between the order of waviness and the amplitude of waviness on the rolling contact surface through harmonic analysis of the measured values at respective points; the step (S2) of logarithmically converting so obtained relationship between the order of waviness and the amplitude of waviness; the step (S3) of defining a regression line showing the relationship between the order of waviness and the amplitude of waviness at the coordinates that have been logarithmically converted; and the step (S4) of evaluating deformation on the rolling contact surface based on the deviation at each point from the above described regression line showing the relationship between the order and the amplitude of waviness at the above described coordinates that have been logarithmically converted. The details of each step are described below in reference to FIGS. 3 to 5.

Figure 3:
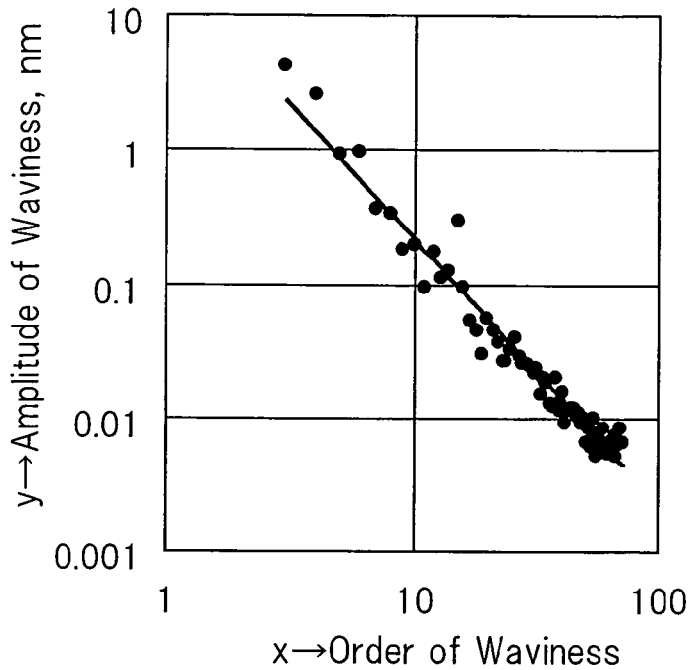
FIG. 3 is a graph gained through data processing at the first stage according to the evaluation method.

FIG. 3 shows an example of measurement of the relationship between the order of waviness and the amplitude on the rolling contact surface made of the external spherical surface of a rolling element 3. This figure shows the relationship between the order of waviness and the amplitude of waviness obtained by measuring the deviation at plural points on the rolling contact surface of the rolling element 3 from the circularity and conducting harmonic analysis of the measured values. The deviation at each point on the rolling contact surface from the circularity is gained using a circularity measuring gauge (not shown). In this figure, the abscissa (x axis), which shows a logarithmic scale, indicates the order of waviness, and the ordinate (y axis), which also shows a logarithmic scale, indicates the amplitude, and each measured point is plotted at x-y coordinates. In this diagram, the regression line of the measured points is also shown.

It can be seen from this graph of x-y coordinates, which both show logarithmic scales, that the relationship between the order of waviness and the amplitude is a linear relationship. Also, it can be confirmed that the orders of waviness showing an amplitude greater than the regression line fall in 3, 4, 6 and 15.

Figure 4:
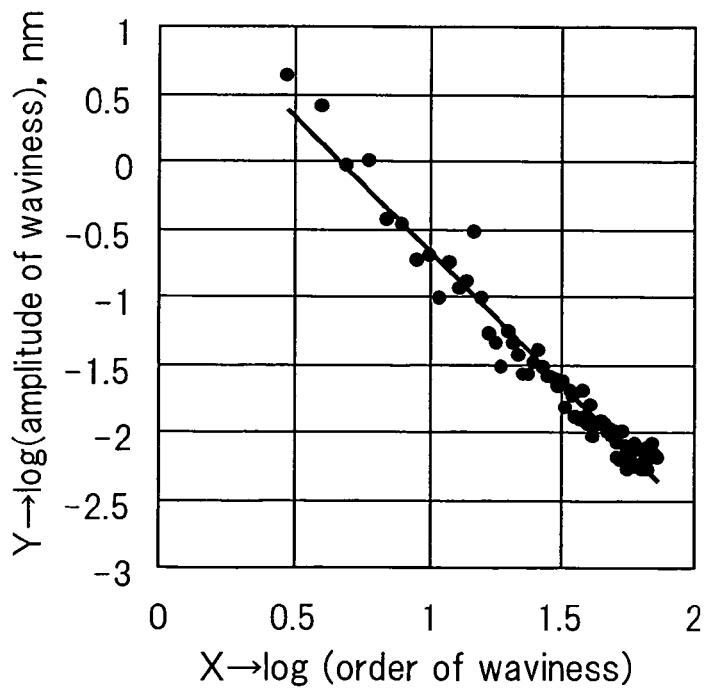
FIG. 4 is a graph gained through data processing at the second stage according to the evaluation method.

According to this evaluation method, the above described linear relationship is used to detect abnormal values (deformation on the rolling contact surface of the rolling element 3), and to this effect, the variable change is conducted to the x axis and the y axis in FIG. 3 to use a new coordinates X and Y X=Log x and Y=Log y. The results of this variable change are shown in FIG. 4. The standard deviation a of Y in these X-Y coordinates is calculated.

Figure 5:
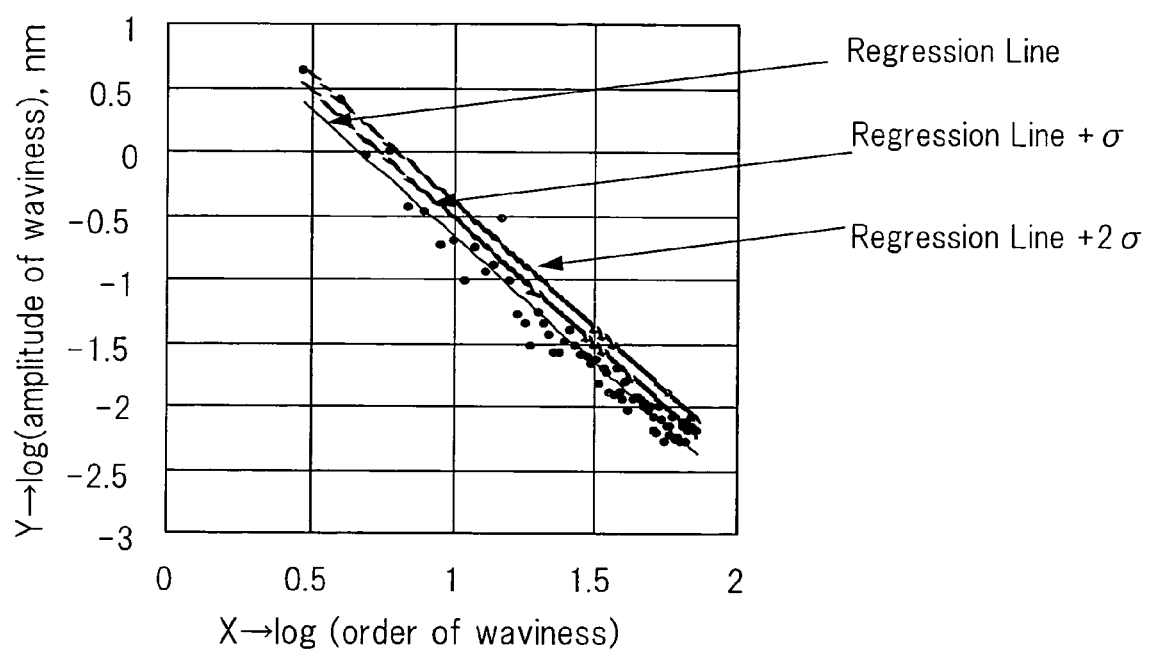
FIG. 5 is a graph gained through data processing at the third stage according to the evaluation method.

FIG. 5 shows a graph where lines for Y+σ and Y+2σ are added to the regression line in FIG. 4. It can be seen in FIG. 5 that, for example, the measured value plotted far right of the line for Y+2σ, is of an order of waviness 15. Accordingly, it can be determined from the graph in FIG. 5 that, statistically, the order of waviness 15 has large amplitude.

Therefore, according to this evaluation method, it is determined abnormal in the case where the measured value of the amplitude Yn of an order of waviness n (n is a natural number) is equal to or greater than a value (aX+b+mσ) gained by adding the value ma based on the standard deviation σ to the value aX+b, which is a linearly regressed value. Here, a and b are constants, and m is an arbitrarily set constant. Where the amplitude in the entirety is to be supervised and controlled, the values of a and b in the linearly regressed value may be so selected.

According to this embodiment, as described above, X=Log (n) is defined from the order of waviness n and Y=Log(rn) is defined from the amplitude rn of the order of waviness n based on the results of measurement of the order of waviness and the amplitude of the waviness of the rolling bearing part, and subsequently, the regression line aX+b and the standard deviation σ are obtained. Then it is assumed to be abnormal where the measured value Yn is equal to or greater than the value of the regression line+mσ. Therefore, deformation on the rolling contact surface of the rolling element 3 which is a rolling bearing part can be easily and appropriately detected from the linear relationship between the order of waviness and the amplitude of the waviness. Accordingly, vibration in the rolling bearings can be reduced, that is to say, vibration in mechanical apparatus using rolling bearings can be reduced.

While, it is obvious that vibration due to the waviness of a rolling bearing causes vibration in the mechanical apparatus in which the rolling bearing is incorporated, it is not desirable for the auditory senses of human beings to be unpleasantly stimulated. In general, the frequency band most easily detectable by the auditory senses is approximately 200 Hz, and therefore, where the rotational ring of the rolling bearing is the inner ring 1, for example, the rotational speed of the machine incorporating the rolling bearing is N rotations per minute, the order of waviness n satisfyinq 2000=(N/60)n becomes a vibration source. In the case where the rated speed of the motor is 1800 rpm, such particular order of waviness n is approximately 67. Accordingly, the above described evaluation method may be used to supervise the amplitude of the particular order of waviness in accordance with the conditions of use.

In particular, where it is desired for the amplitude of the order of waviness to be controlled or managed in a pleasing way for the auditory senses, m in mσ may be changed depending on the order of waviness. The management value ma may be stricter or smaller as the order of waviness increases, by setting, for example, m to be proportional to 1/n or n1/2.

When it is intended to avoid resonance with the characteristic frequency in a mechanical apparatus, the range of the order of waviness related to such resonance may be extracted for vibration control. For example, where the characteristic frequency of a mechanical apparatus is 2000 Hz and the rotational speed of the inner ring 1 is 1800 rpm, the order of waviness n in a range of approximately 60 to 80, which covers the order of waviness 67 of the inner ring 1, may be attended, to control.

Although in the foregoing embodiment, the evaluation method has been described for evaluating deformation on the rolling contact surface of the steel ball 3 which is a rolling element in a rolling bearing, deformation on the raceway surface 1a or 2a, which is the rolling contact surface of a raceway ring, for example the inner ring 1 or the outer ring 2, which are examples of rolling bearing parts, can also be easily and appropriately detected according to this evaluation method. The evaluation method according to the present invention is also applicable to the bearing part in which the rolling element is a cylindrical roller, a conical roller, a spherical roller or a needle roller.

Although the present invention has been fully described in connection with the preferred embodiments thereof with reference to the accompanying drawings which are used only for the purpose of illustration, those skilled in the art will readily conceive numerous changes and modification within the framework of obviousness upon the reading of the specification herein presented of the present invention. Accordingly, such changes and modifications are, unless they depart from the scope of the present invention as delivered from the claims annexed hereto, to be construed as included therein.

What is claimed is:

1. An evaluation method for a rolling bearing part made of a raceway ring or a rolling element in a rolling bearing, comprising:

measuring, using a measuring apparatus, the deviation at plural points on a rolling contact surface in the rolling bearing part from the circularity to obtain the relationship between the order of waviness and the amplitude of waviness on the rolling contact surface through harmonic analysis of the measured values at respective points; and performing, using a processor, the operations of
   logarithmically converting so obtained relationship between the order and the amplitude of waviness;
   defining a regression line showing the relationship between the order and the amplitude of waviness at the coordinates that have been logarithmically converted; and
   evaluating deformation on the rolling contact surface based on the deviation at each point from said regression line showing the relationship between the order and the amplitude of waviness at the coordinates that have been logarithmically converted.

2. The evaluation method for a rolling bearing part according to claim 1, wherein an appropriate reference value based on the standard deviation of the relationship between the order of waviness and the amplitude of waviness at said coordinates that have been logarithmically converted is used, and, said deformation is determined to be abnormal when said deviation is equal to or greater than such reference value.

3. The evaluation method for a rolling bearing part according to claim 2, wherein during said step for logarithmic conversion, the order of waviness n, n being a natural number, is converted to $X=\text{Log}(n)$, and the amplitude rn of the order of waviness n is converted to $Y=\text{Log}(rn)$, so that $Y=aX+b$, a and b being constants, is defined as the regression line in the step for defining said regression line, and when the measured and converted value Yn of the order of waviness n is equal to or greater than a value obtained by adding the value $m\sigma$, m being an arbitrarily set constant, with the standard deviation $\sigma$ of the measured values to the value $aX+b$ which has been linearly regressed, determination of abnormality is established.

4. A system to evaluate form errors and geometric imperfections in a rolling bearing part made of a raceway ring or a rolling element in a rolling bearing, comprising:

a measurement apparatus to measure the deviation at plural points on a rolling contact surface in the rolling bearing part from the circularity to obtain the relationship between the order of waviness and the amplitude of waviness on the rolling contact surface through harmonic analysis of the measured values at respective points; and a general purpose computer including
   a logarithmic conversion unit to logarithmically convert the relationship obtained by the measurement apparatus between the order and the amplitude of waviness;
   a regression line defining unit to define a regression line showing the relationship between the order and the amplitude of waviness at the coordinates that have been logarithmically converted; and
   an evaluating unit to evaluate deformation on the rolling contact surface based on the deviation at each point from said regression line showing the relationship between the order and the amplitude of waviness at the coordinates that have been logarithmically converted.

5. The system according to claim 4, wherein the evaluating unit uses an appropriate reference value based on the standard deviation of the relationship between the order of waviness and the amplitude of waviness at said coordinates that have been logarithmically converted, and
   the deformation is determined to be abnormal by the evaluating unit when said deviation is equal to or greater than the reference value.

6. The system according to claim 5, wherein in the logarithmic conversion unit, the order of waviness n, n being a natural number, is converted to $X=\text{Log}(n)$,
   in the regression line defining unit, the amplitude rn of the order of waviness n is converted to $Y=\text{Log}(rn)$, so that $Y=aX+b$, a and b being constants, is defined as the regression line, and
   when the measured and converted value Yn of the order of waviness n is equal to or greater than a value obtained by adding the value $m\sigma$ (m is an arbitrarily set constant) with the standard deviation $\sigma$ of the measured values to the value $aX+b$ which has been linearly regressed, determination of abnormality by the evaluating unit is established.

* * * * *

UNITED STATES PATENT AND TRADEMARK OFFICE
CERTIFICATE OF CORRECTION

| | | |
|---|---|---|
| PATENT NO. | : 7,877,215 B2 | Page 1 of 1 |
| APPLICATION NO. | : 11/989755 | |
| DATED | : January 25, 2011 | |
| INVENTOR(S) | : Akamatsu | |

It is certified that error appears in the above-identified patent and that said Letters Patent is hereby corrected as shown below:

First Page, Column 1 of the issued Patent, please insert after item 65
Item --(30) Foreign Application Priority Data
Aug. 3, 2005 (JP) ............... 2005-224911--.

Signed and Sealed this
Fourteenth Day of June, 2011

David J. Kappos
*Director of the United States Patent and Trademark Office*